(12) United States Patent
Ecim et al.

(10) Patent No.: US 10,059,197 B2
(45) Date of Patent: Aug. 28, 2018

(54) VALVE DEVICE

(71) Applicant: MAGNA STEYR Fuel Systems GesmbH, Sinabelkirchen (AT)

(72) Inventors: Marko Ecim, Graz (AT); Eduard Eggenreich, Weiz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 0 days.

(21) Appl. No.: 15/455,480

(22) Filed: Mar. 10, 2017

(65) Prior Publication Data
US 2017/0259664 A1    Sep. 14, 2017

(30) Foreign Application Priority Data

Mar. 10, 2016 (EP) .................................... 16159583

(51) Int. Cl.
| | |
|---|---|
| *B60K 15/035* | (2006.01) |
| *F16K 31/22* | (2006.01) |
| *B60K 15/04* | (2006.01) |
| *B60K 15/03* | (2006.01) |

(52) U.S. Cl.
CPC ........ *B60K 15/03519* (2013.01); *B60K 15/04* (2013.01); *F16K 31/22* (2013.01); *B60K 2015/03289* (2013.01); *B60K 2015/0461* (2013.01); *Y10T 137/3099* (2015.04)

(58) Field of Classification Search
CPC .............. B60K 15/03519; B60K 15/04; B60K 2015/0461; B60K 2015/03289; B60K 2015/03566; B60K 2015/03557; F16K 31/22
See application file for complete search history.

(56) References Cited

U.S. PATENT DOCUMENTS

| | | | | |
|---|---|---|---|---|
| 4,714,172 A * | 12/1987 | Morris | ............. | B60K 15/03519 137/351 |
| 4,869,283 A * | 9/1989 | Oeffling | ........... | B60K 15/03519 137/43 |
| 5,596,971 A | 1/1997 | Kidokoro | | |
| 8,967,181 B2 * | 3/2015 | Wetzel | ............. | B60K 15/03519 137/202 |
| 2006/0011173 A1 * | 1/2006 | Davis | ............... | B60K 15/03177 123/520 |

FOREIGN PATENT DOCUMENTS

| | | |
|---|---|---|
| DE | 20110760 U1 | 9/2001 |
| EP | 0993980 A1 | 4/2000 |
| WO | 2007/088023 A1 | 8/2007 |

* cited by examiner

*Primary Examiner* — Michael R Reid
*Assistant Examiner* — Patrick Williams
(74) *Attorney, Agent, or Firm* — Jordan IP Law, LLC; Todd A. Vaughn

(57) ABSTRACT

A valve device, a ventilation device having the valve device, and a motor vehicle tank device having the ventilation device. The connection between a valve inlet of the valve device and a tank outlet is to be opened and closed by the tank valve, and a connection between the inlet and the filler pipe outlet may be opened and closed by the filler pipe valve.

12 Claims, 4 Drawing Sheets

VALVE DEVICE

CROSS-REFERENCE TO RELATED APPLICATIONS

The present application claims priority 35 U.S.C. § 119 to European Patent Publication No. EP 16159583.0 (filed on Mar. 10, 2016), which is hereby incorporated by reference in its entirety.

TECHNICAL FIELD

Embodiments relate to a valve device for a ventilation device for a tank device of a motor vehicle, a ventilation device comprising the valve device, and a tank device comprising the ventilation device.

BACKGROUND

Ventilation devices are used in fuel tanks of motor vehicles in order to remove from the tank gases which arise in the tank during the operation thereof or during refuelling of the tank (venting), or to supply required gases, especially air, to the tank (gas admission). For this purpose, ventilation lines are passed out of the tank, and the gases are passed, via intermediate stages such as vapour traps and compensation tanks, for example, to the outside, generally via a fuel vapour filter, such as an activated carbon filter. In this context, it is possible to envisage valves which open a ventilation line exclusively during a refuelling operation (refuel ventilation line) or which open a ventilation line exclusively or additionally during normal operation of the tank device (service ventilation line).

It is known, e.g. from DE 10 2006 004 630 A1, that a connection to a filler pipe may be provided between a refuel ventilation line and the fuel vapour filter, said connection being referred to as a recirculation opening or as a recirculation channel. Via a recirculation channel of this kind, it is possible for some of the gases displaced from the tank during refuelling to recirculate through the filler pipe into the tank.

It is also possible to use a connection from a ventilation line to the filler pipe for on-board diagnosis (OBD), for example.

If a ventilation device has a fluid-carrying connection between a ventilation line and a filler pipe, however, there is the problem that, if the fuel pump nozzle allows continued flow, i.e. if there is a malfunction that causes the fuel pump nozzle not to shut off, fuel can pass from the fuel pump nozzle, via the filler pipe and the fluid-carrying connection, to the ventilation line and thus onward to a fuel vapour filter, for example.

SUMMARY

Embodiments relate to an enhanced valve device for a ventilation device of the stated type in this respect and, in particular, to a valve device which prevents the entry of fuel from a filler pipe into a ventilation line if the fuel pump nozzle allows continued flow, and to specify a corresponding ventilation device and tank device comprising a valve device of this kind.

Embodiments relate to a valve device for a ventilation device for a tank device of a motor vehicle, wherein the valve device comprises an inlet, which may be connected to a ventilation inlet line of the ventilation device, a tank outlet, which may be connected to a ventilation outlet line of the ventilation device, and a filler pipe outlet, which may be connected to a filler pipe of the tank device, wherein the valve device furthermore comprises a tank valve, which has a tank valve seat, and a filler pipe valve, which has a filler pipe valve seat, wherein the connection between the inlet and the tank outlet may be opened and closed by the tank valve, and the connection between the inlet and the filler pipe outlet may be opened and closed by the filler pipe valve.

In accordance with embodiments, the expressions "connected" and "may be connected" always mean connected fluidically, and may be connected fluidically, respectively. A connection is preferably a direct connection.

"Filler pipe" can also always mean one end of the filler pipe, in particular a filler pipe end designed as a tank stub.

In accordance with embodiments, "ventilation device" is intended to mean a device which can discharge and/or supply gases and therefore, in the narrower sense, includes venting and/or gas admission.

To enable the ventilation inlet line and/or the ventilation outlet line to be connected to the tank, they may each have, in particular, a tank connection.

To enable the ventilation inlet line and the ventilation outlet line to be connected to the ventilation inlet line and ventilation outlet line respectively, the inlet and/or the tank outlet may be designed as nipples, in particular, as plug-in nipples with mouldings formed radially on the outside that can prevent an attached line from slipping off.

In accordance with embodiments, the valve device of a ventilation device has a filler pipe outlet that may be connected to a filler pipe of the tank device. However, this filler pipe outlet can also be closed via a filler pipe valve, e.g., in the case where a fuel pump nozzle allows continued flow, to prevent fuel from entering the inlet and thus the ventilation inlet line.

The valve device furthermore has a tank valve, thus allowing the connection between the inlet and the tank outlet to be closed, in particular during a refuelling operation, ensuring that only the closable filler pipe outlet remains open as an outlet.

In particular, the ventilation inlet line may be a first outlet line, which is branched off from the main ventilation line or refuel ventilation line, e.g. via a compensating tank or a separating device, the other, second branch of which first outlet line may be a fuel vapour filter line, which can open into a fuel vapour filter. The branch and the lines are preferably designed in such a way that only a small proportion of the gases from the refuel ventilation line is branched off into the ventilation inlet line, e.g. approximately 1 percent, and the remaining, larger proportion of the gases is discharged through the fuel vapour filter line.

Developments of the invention are specified in the dependent claims, the description and the attached drawings.

The tank valve preferably comprises an axially movable valve tappet for actuation, wherein the valve tappet is accessible from outside the valve device, thus allowing the tank valve to be closed by axial movement of the valve tappet, in particular in the direction of the interior of the valve device, via the action of a force from outside the valve device, in particular by the introduction of a fuel pump nozzle into the filler pipe of the tank device.

The tank valve is preferably closed by the introduction of a fuel pump nozzle into the filler pipe or tank stub, i.e. during refuelling. In the refuelling state, the filler pipe valve preferably remains open in the normal case, i.e. especially when no fuel builds up in the region of the filler pipe valve owing to a fuel pump nozzle allowing continued flow, and therefore recirculation of gases into the tank through the filler pipe during refuelling can occur, for example. In the case where a fuel pump nozzle allows continued flow, the filler pipe valve may be closed, and therefore it is not possible, in particular, for fuel to enter the ventilation inlet line and pass onward to an activated carbon filter.

While no refuelling is taking place, i.e. in a normal mode of the tank device, the tank valve is preferably opened, in particular via a return spring, thus allowing gases to enter the tank through the ventilation outlet line.

The filler pipe outlet preferably comprises a bore in the valve tappet. The filler pipe outlet preferably extends radially inwards in a valve tappet of hollow design, along the axis of the valve tappet.

The tank valve preferably comprises a tank valve member, wherein, given a sufficient axial movement of the valve tappet, the tank valve member is simultaneously moved axially by the valve tappet and can thereby come to rest on the tank valve seat to close the tank valve.

The filler pipe valve seat is preferably formed on the tank valve member.

The filler pipe valve preferably has, as a valve member, a float which, when floating on a liquid provided for the tank, can come to rest on the filler pipe valve seat to close the filler pipe valve.

As a particularly preferred option, the float is a ball which has a lower density than the fuel intended to be held in the tank, in particular petrol and/or diesel. The float is preferably arranged in a cage. The float, optionally with the cage, is preferably arranged in a bore of the valve tappet, in particular in the filler pipe outlet.

Return springs are preferably arranged between the valve tappet and the tank valve member and/or between the tank valve member and a housing of the valve device, with the result that, after being actuated by axial movement towards the inside, the valve tappet is pushed back outwards, and the tank valve member is preloaded in the direction of an open tank valve.

In accordance with embodiments, a ventilation device for a tank device of a motor vehicle comprises a ventilation inlet line, which may be connected to a tank of the tank device, a ventilation outlet line, which may be connected to the tank, and a valve device of the kind described above, wherein the inlet of the valve device is connected to the ventilation inlet line, wherein the tank outlet of the valve device is connected to the ventilation outlet line.

In accordance with embodiments, a tank device of a motor vehicle comprises a tank, a filler pipe and a ventilation device of the kind described above, wherein the ventilation inlet line is connected to the tank, the ventilation outlet line is connected to the tank, and the filler pipe outlet of the valve device is connected to the filler pipe, in particular to one end of the filler pipe, namely a tank stub.

The valve device is preferably mounted in such a way that the valve tappet extends partially into the filler pipe, and the valve tappet is moved axially by the introduction of a fuel pump nozzle into the filler pipe, in particular by the movement of a flap, and thereby closes the tank valve. The axial movement of the valve tappet may be initiated directly by the fuel pump nozzle or, alternatively, indirectly via one or more intermediate elements, in particular by pivoting a flap, with the result that the flap is pivoted by the fuel pump nozzle, and the valve tappet is moved by the flap. The valve device is preferably mounted in the region of a filler stub of the filler pipe.

DRAWINGS

The invention is described by way of example below with reference to the drawings.

DESCRIPTION

Figure 1:
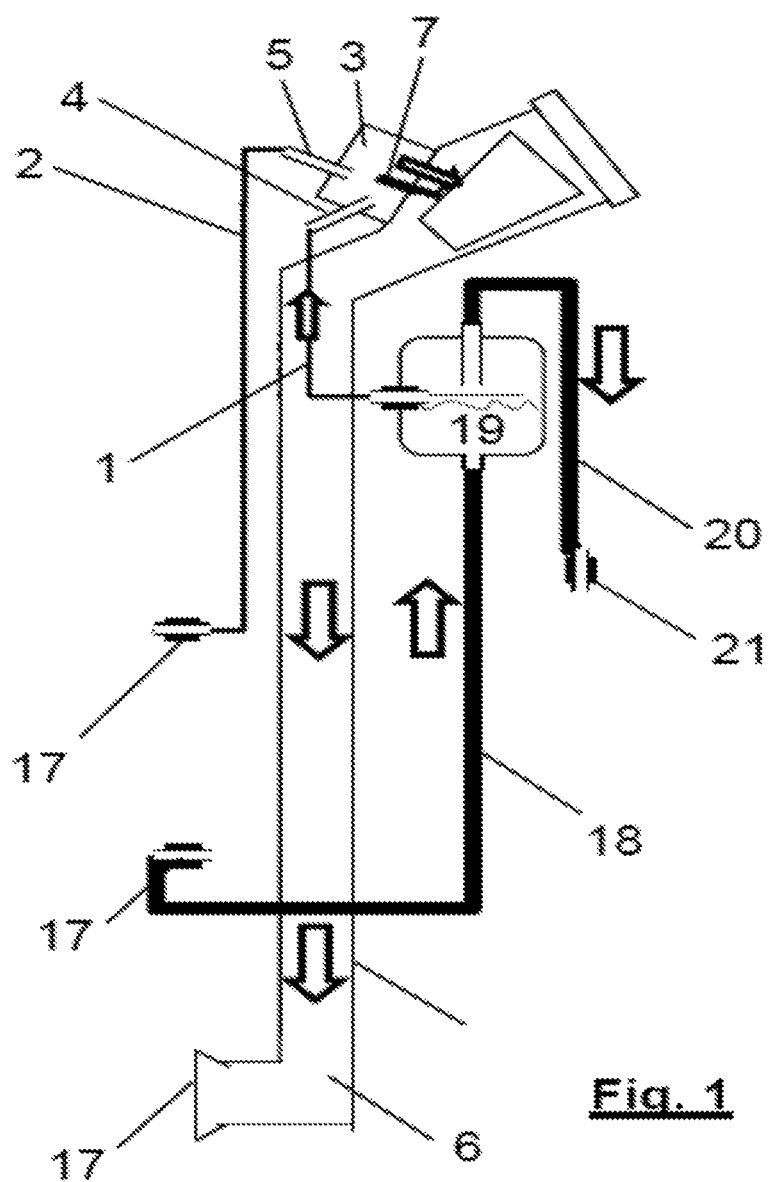
FIG. 1 illustrates a schematic illustration of a ventilation device on a filler pipe, in accordance with embodiments.

FIG. 1 illustrates, in accordance with embodiments, a ventilation device, having a valve device 3, which is mounted on a filler pipe 6 of a tank device. The filler pipe 6 extends from an upper end designed as a tank stub as far as a tank connection 17, at which the filler pipe 6 may be connected or is connected to a tank (not illustrated) of the tank device.

A ventilation outlet line 2 can likewise be connected to the tank of the tank device via a tank connection 17, as can, indirectly, a ventilation inlet line 1. In this case, the ventilation inlet line 1 forms a line branch branched off via a compensating tank 19 from a refuel ventilation line 18 having a tank connection 17. The larger part of the refuel ventilation line 18, the part which is not branched off, forms the fuel vapour filter line 20 and may be connected to an activated carbon filter or some other fuel vapour filter via an activated carbon filter connection 21.

The arrows illustrated in the lines each show the direction of ventilation, while the arrows in the filler pipe show the direction in which the tank is filled with fuel. The gases entering the filler pipe 6 through the ventilation inlet line 1 via the valve device 3 can recirculate into the tank through the filler pipe 6 with the fuel during a refuelling process.

In the case where the ventilation device is used for gas admission, gas, in particular air, can flow in in the opposite direction via the activated carbon filter connection 21 and the fuel vapour filter line 20, and some of it can enter the tank via the refuel ventilation line 18 and some can flow via the ventilation inlet line 1 to the valve device 3 in this case too.

An inlet 4 of the valve device 3 is connected to the ventilation inlet line 1, and the tank outlet 5 of the valve device 3 is connected to the ventilation outlet line 2. A filler pipe outlet 7 of the valve device 3 is connected to the filler pipe 6.

The valve device 3 is mounted on the filler pipe 6 in such a way that the filler pipe outlet 7 and thus a valve tappet 10 (see FIG. 2) at the filler pipe outlet 7 extends into the filler pipe 6, and the valve tappet 10 is moved axially via a pivotable flap owing to the introduction of a fuel filler nozzle into the filler pipe 6 and thereby closes the tank valve, with the result that gases flowing in at the inlet 4 can leave the valve device 3 only through the filler pipe outlet 7.

Figure 2:
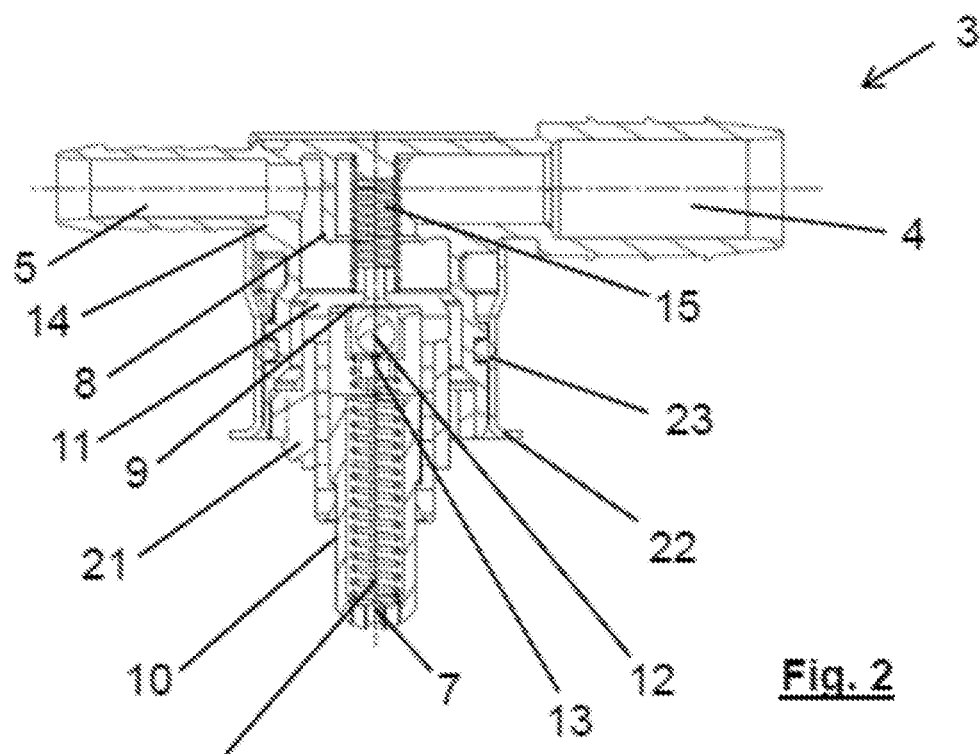
FIG. 2 illustrates a side, sectional view (of section line A-A in FIG. 3) of a valve device in a normal operating state, in accordance with embodiments.
Figure 3:
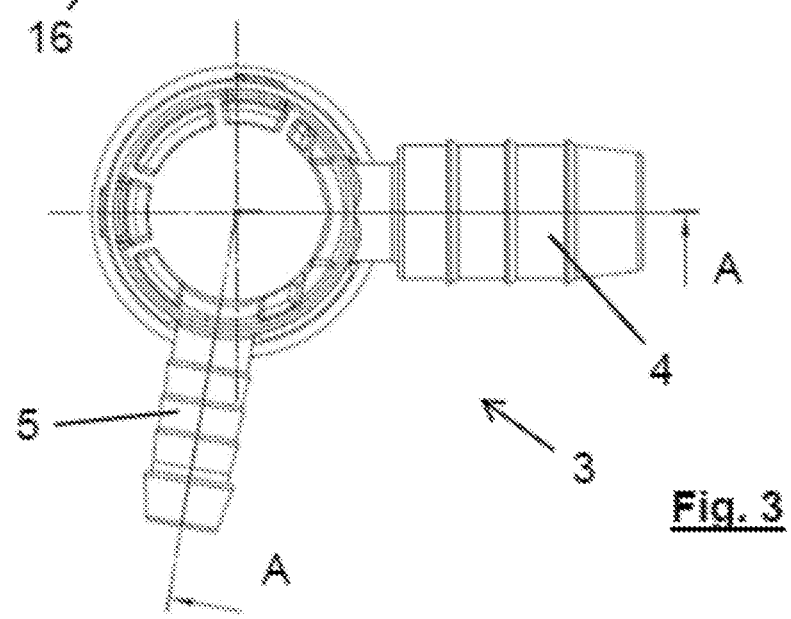
FIG. 3 illustrates an illustration of a top view of the valve device of in FIG. 2.

FIG. 2 illustrates, in accordance with embodiments, a section through a valve device 3 from the side in a normal operating state, i.e. when no refuelling is taking place, in accordance with section line A-A in FIG. 3.

The valve device 3 has an inlet 4 in the form of a plug-in nipple, which may be connected to a ventilation inlet line 1, and a tank outlet 5 in the form of a second plug-in nipple, which may be connected to a ventilation outlet line 2. For fluidic connection to a filler pipe 6 of a tank device, the valve device 3 furthermore has a filler pipe outlet 7, the connection of which to the inlet 4 may be closed via a filler pipe valve. The filler pipe valve comprises a filler pipe valve seat 9, on which a float 12, namely a ball of low density, can come to rest. The float 12 is mounted in a cage 13 at that end of the valve tappet 10 which faces the interior of the valve device 3. As long as the float 12 is not surrounded by fuel, for example, the float rests on the bottom of the cage 13 and does not close the filler pipe valve.

The filler pipe outlet 7 is formed by a bore in the valve tappet 10. The float 12 is arranged in the valve tappet 10, which is embodied as a hollow body, or arranged in the bore of the valve tappet 10.

The tank valve of the valve device 3 has a tank valve member 11, wherein, given a sufficient axial movement of the valve tappet 10, the tank valve member 11 is simultaneously moved axially by the valve tappet 10 and can thereby come to rest on a tank valve seat 8 to close the tank valve, i.e. the connection between the inlet 4 and the tank outlet 5. The filler pipe valve seat 9 is formed on the tank valve member 11.

A tappet spring 16 acts as a return spring between the valve tappet 10 and the tank valve member 11, and a valve spring 15 acts as a return spring between the tank valve member 11 and a housing 14 of the valve device 3.

The valve tappet 10 is designed as a hollow cylinder and is arranged coaxially and within the tank valve member 11. The tank valve member 11 is likewise designed as a hollow cylinder and, for its part, is once again arranged coaxially and within a valve guide 21. The valve guide 21 is arranged coaxially and within the housing 14 and a valve receptacle 22. A ring seal 23 is arranged in a groove in the housing 14, between the housing 14 and the valve receptacle 22.

Figure 4:
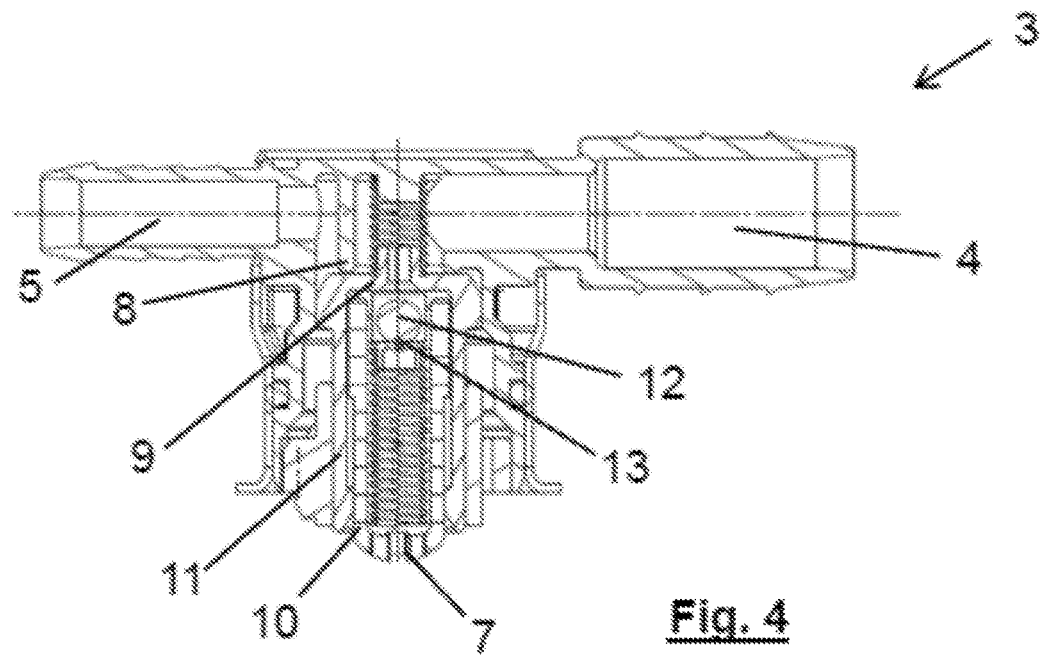
FIG. 4 illustrates a side, sectional view (of section line A-A in FIG. 5) of a valve device in a normal refuelling state, in accordance with embodiments.
Figure 5:
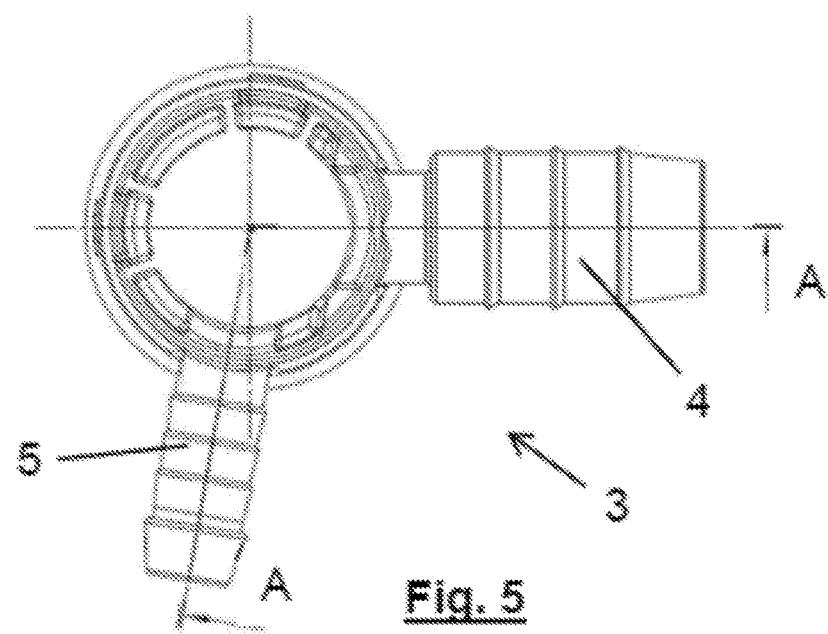
FIG. 5 illustrates a top view of the valve device of FIG. 4.

FIG. 4 illustrates, in accordance with embodiments, the same valve device 3 in a normal refuelling state, i.e., during a refuelling operation. In this case, the valve tappet 10 has been pushed inwards and therefore upwards in FIG. 4. The tank valve member 11 is seated on the tank valve seat 8 and thus closes the tank valve and hence the tank outlet 5. The float 12 furthermore rests on the bottom of the cage 13, and therefore the filler pipe valve and hence the filler pipe outlet 7 remain open and recirculation can take place.

Figure 6:
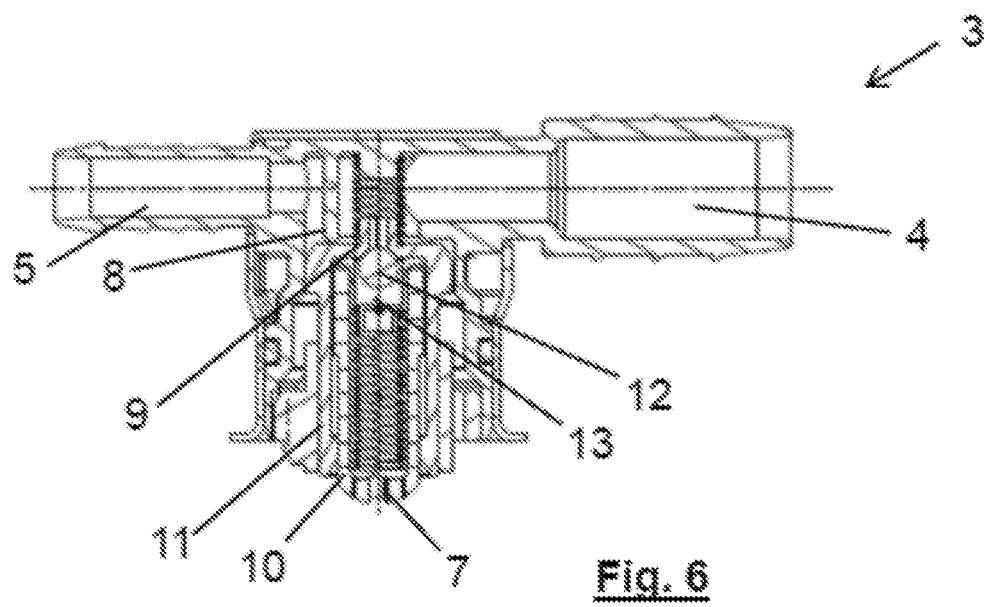
FIG. 6 illustrates a side, sectional view (of section line A-A in FIG. 7) of a valve device, in a refuelling state, with a fuel pump nozzle which allows continued flow, in accordance with embodiments.
Figure 7:
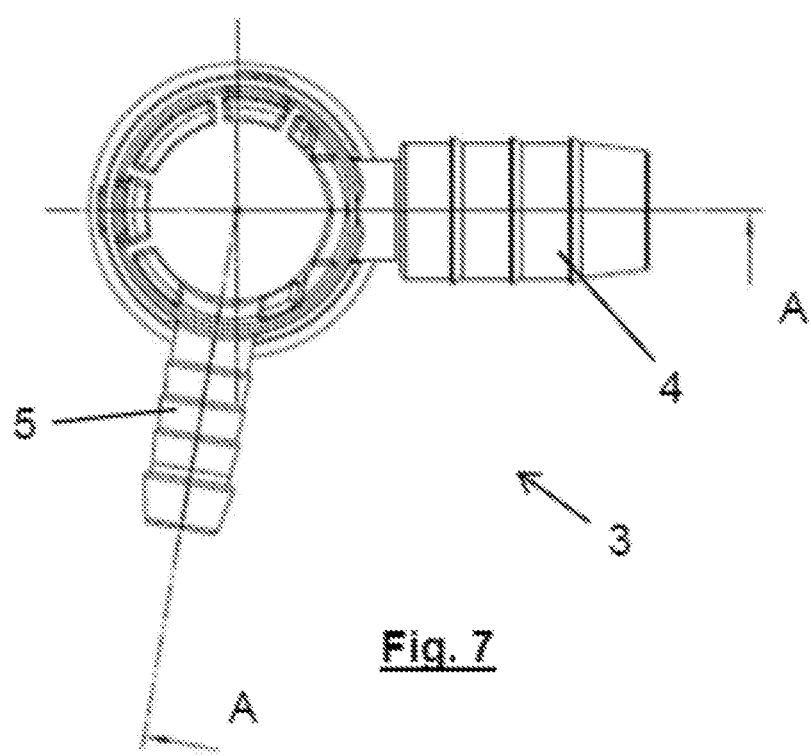
FIG. 7 illustrates a top view of the valve device of FIG. 6.

FIG. 6 illustrates the valve device 3 in a refuelling state with a fuel pump nozzle which allows continued flow. Here, the valve tappet 10 has once again been pressed inwards. The tank valve member 11 is seated on the tank valve seat 8 and thus closes the tank valve and hence the tank outlet 5. Here, the float 12 is floating on fuel, is arranged so as to rest on the filler pipe valve seat 9 at the top edge of the cage 13, and there closes the filler pipe valve and hence the filler pipe outlet 7, thus preventing the fuel surrounding the float 12 from entering the inlet 4.

In conclusion, it is noted that the components in the figure may not be illustrated to scale. Position indications such as "right," "left," "top," "bottom" and the like refer to the illustrated position of the respective component and must be notionally revised accordingly when said position changes.

The terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS 1 ventilation inlet line
2 ventilation outlet line
3 valve device
4 inlet
5 tank outlet
6 filler pipe
7 filler pipe outlet
8 tank valve seat
9 filler pipe valve seat
10 valve tappet
11 tank valve member
12 float
13 cage
14 housing
15 return spring, valve spring
16 return spring, tappet spring
17 tank connection
18 refuel ventilation line
19 compensating tank
20 fuel vapour filter line
21 valve guide
22 valve receptacle
23 ring seal

What is claimed is:

1. A valve device for a ventilation device of a motor vehicle tank device, the valve device comprising:
    a valve inlet configured for operative connection to a ventilation inlet line of the ventilation device;
    a tank outlet configured for operative connection to a ventilation outlet line of the ventilation device;
    a filler pipe outlet configured for operative connection to a filler pipe of the motor vehicle tank device;
    a tank valve having a tank valve seat configured to open and close an operable connection between the valve inlet and the tank outlet;
    an axially movable valve tappet; and
    a filler pipe valve having a filler pipe valve seat configured to open and close an operable connection between the valve inlet and the filler pipe outlet, the filler pipe valve including a float to serve as a valve member, which, when floating on a liquid receiving in the motor vehicle tank device, is to rest on the filler pipe valve seat to close the filler pipe valve, wherein the float is received in a bore of the valve tappet.

2. The valve device of claim 1, wherein the axially movable valve tappet is to be accessible from outside the valve device to allow closure of the valve device by axial movement of the valve tappet via an action of a force from outside the valve device.

3. The valve device of claim 2, wherein the filler pipe outlet comprises the bore in the valve tappet.

4. The valve device of claim 2, further comprising a tank valve member configured for axial movement simultaneously with the valve tappet in response to axial movement of the valve tappet, to rest on the tank valve seat to close the valve device.

5. The valve device of claim 4, wherein the filler pipe valve seat is formed on the tank valve member.

6. The valve device of claim 1, wherein the float comprises a ball.

7. The valve device of claim 1, wherein the float has a lower density than petrol and/or diesel.

8. The valve device of claim 1, further comprising a cage to receive the float.

9. The valve device of claim 2, further comprising a return spring arranged between the valve tappet and the tank valve member.

10. The valve device of claim 2, further comprising a return spring arranged between the tank valve member and a housing of the valve device.

11. A ventilation device for a tank device of a motor vehicle, comprising:
   a ventilation inlet line configured for operative connection to a tank of the tank device;
   a ventilation outlet line configured for operative connection to the tank; and
   a valve device including:
      a valve inlet configured for operative connection to the ventilation inlet line;
      a tank outlet configured for operative connection to the ventilation outlet line;
      a filler pipe outlet configured for operative connection to a filler pipe of the motor vehicle tank device;
      a tank valve having a tank valve seat configured to open and close an operable connection between the valve inlet and the tank outlet;
      a filler pipe valve having a filler pipe valve seat configured to open and close an operable connection between the valve inlet and the filler pipe outlet; and
      an axially movable valve tappet which is to be accessible from outside the valve device to allow closure of the valve device by axial movement of the valve tappet via an action of a force from outside the valve device,
   wherein the valve device is mounted such that the valve tappet extends partially into the filler pipe, and the valve tappet is configured for axial movement by introduction of a fuel pump nozzle into the filler pipe to thereby close the tank valve.

12. A tank device for a motor vehicle, comprising:
a filler pipe; and
a ventilation device including:
   a ventilation inlet line configured for operative connection to a tank of the tank device;
   a ventilation outlet line configured for operative connection to the tank;
   a valve device including a valve inlet configured for operative connection to the ventilation inlet line, a tank outlet configured for operative connection to the ventilation outlet line, a filler pipe outlet configured for operative connection to a filler pipe of the motor vehicle tank device, a tank valve having a tank valve seat configured to open and close an operable connection between the valve inlet and the tank outlet; and a filler pipe valve having a filler pipe valve seat configured to open and close an operable connection between the valve inlet and the filler pipe outlet; and
   an axially movable valve tappet which is to be accessible from outside the valve device to allow closure of the valve device by axial movement of the valve tappet via an action of a force from outside the valve device,
wherein the valve device is mounted such that the valve tappet extends partially into the filler pipe, and the valve tappet is configured for axial movement by introduction of a fuel pump nozzle into the filler pipe to thereby close the tank valve.

* * * * *